United States Patent [19]

Singh et al.

[11] Patent Number: 5,061,435
[45] Date of Patent: Oct. 29, 1991

[54] HIGH-TEMPERATURE REACTOR

[75] Inventors: Jasbir Singh, Juelich; Heiko Barnert, Langerwehe; Hans Hohn, Juelich, all of Fed. Rep. of Germany

[73] Assignee: Forschungszentrum Julich GmbH, Julich, Fed. Rep. of Germany

[21] Appl. No.: 553,088

[22] Filed: Jul. 17, 1990

[30] Foreign Application Priority Data

Jul. 20, 1989 [DE] Fed. Rep. of Germany ....... 3923962

[51] Int. Cl.$^5$ .............................................. G21C 9/00
[52] U.S. Cl. ..................................... 376/298; 376/299; 376/383; 376/387; 376/400; 376/207; 376/210
[58] Field of Search ............... 376/207, 210, 298, 299, 376/383, 387, 400

[56] References Cited

U.S. PATENT DOCUMENTS 3,773,618  11/1973  Gratton ................................. 376/390
4,243,487  1/1981  Schweiger ........................... 376/298

FOREIGN PATENT DOCUMENTS 2217057  10/1982  Fed. Rep. of Germany .
3435255   4/1986  Fed. Rep. of Germany .
3643929   4/1988  Fed. Rep. of Germany .

OTHER PUBLICATIONS

J. Singh et al., Steam Generator Concept of a Small HTR for Reheating or for Removal of the Residual Heat; 1988, pp.; 141-147.

Primary Examiner—Brooks H. Hunt
Assistant Examiner—Meena Chelliah
Attorney, Agent, or Firm—Shlesinger, Arkwright & Garvey

[57] ABSTRACT

A high-temperatue reactor with at least one reactor core and a bottom cooling-gas intake and a top cooling-gas outlet.

12 Claims, 1 Drawing Sheet

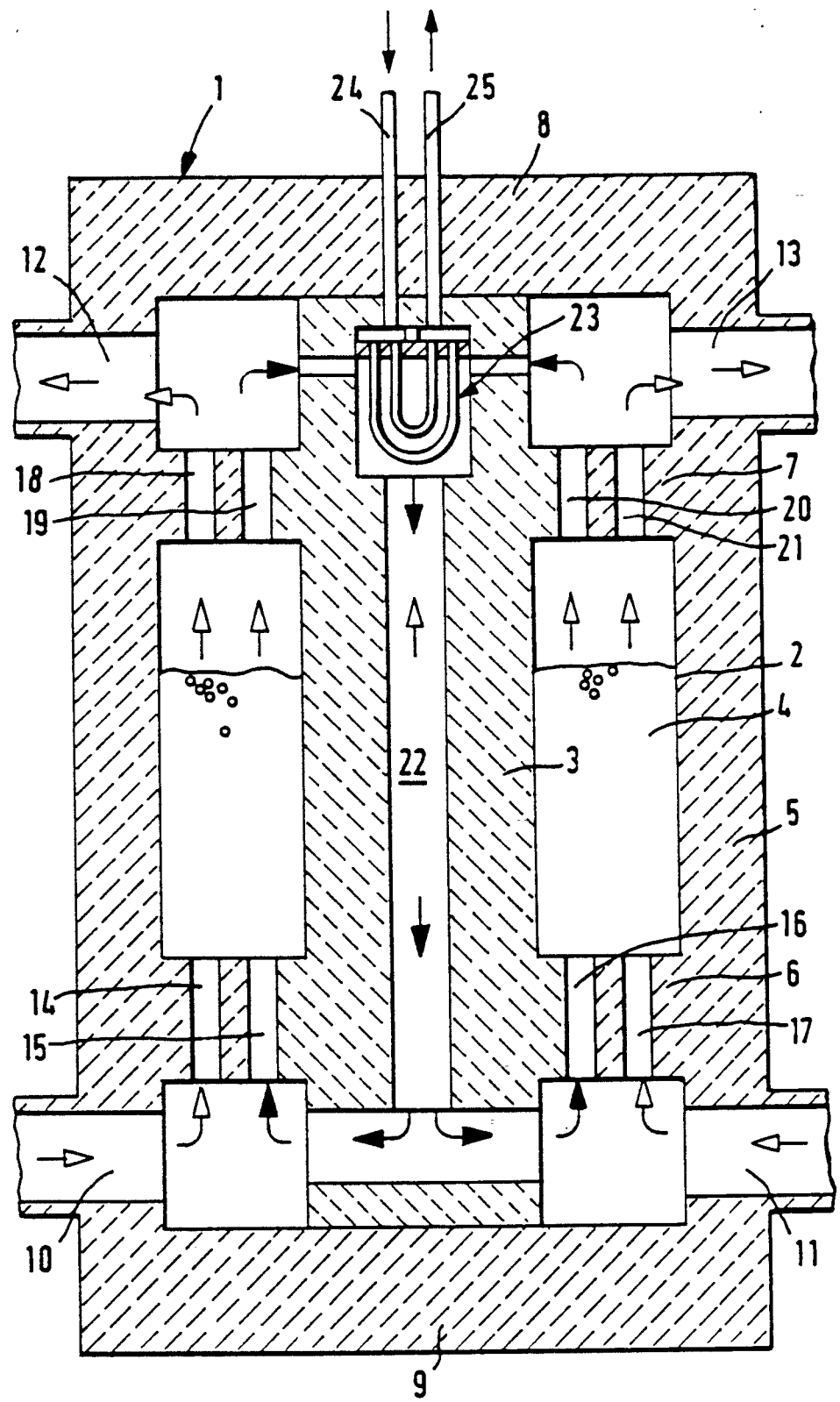

HIGH-TEMPERATURE REACTOR

The invention concerns a high-temperature reactor with at least one reactor core provided with fuel elements and comprising a cooling-gas intake at the bottom and a cooling-gas outlet at the top so that a cooling gas can flow from the bottom to the top through this reactor core.

High-temperature reactors operating on the principle of the upward-flow reactor core have become known through the AVR test reactor of the KERNFORSCHUNGSANLAGE Jülich GmbH. This principle also is used in the HTR-100 which is designed for supplying large industrial plants with heat and power. Both reactors are equipped with a steam generator located above the ceiling reflector, the heated cooling gas—as a rule helium—flowing upward out of the reactor core and releasing its heat in said steam generator to a steam circuit. The steam may be used as desired.

When shutting down a reactor, the heat still generated must be conducted away reliably in a controlled operation of residual heat transfer. In the above cited high-temperature reactors, the upward flow of the cooling gas in the reactor core is maintained by natural convection. The heat transfer then takes place by means of the steam generator. If the steam generator should fail, heat transfer can only take place by radiation, conduction and convection. However that will be insufficient where large power units are concerned.

As regards high-temperature reactors in which the flow through the reactor core is from top to bottom, separate circuits for transferring the residual heat are provided (German patent 36 43 929). This system consists of a vertical riser pipe and also of a vertical, connecting fall pipe leading to a discharge equipped with a check valve. A cooler is present in the upper part of the fall pipe. This residual-heat transfer system is flow-less in normal operation.

Upon failure of the main blower in the cooling-gas primary circuit, an accessory blower starts and pulls the cooling gas from the bottom of the reactor core into the riser pipe, this cooling gas then being cooled in the cooler of the adjoining fall pipe. In this manner an auxiliary circuit is put into operation provided the cooler in the fall pipe be high enough and the temperature difference between the riser and fall pipes be sufficient. The auxiliary blower is shut off following short operation and a bypass valve to bypass the auxiliary blower is opened. Because of natural convection, the coolant auxiliary circuit maintains itself automatically in the reactor core and with the required downflow in spite of the raised temperature of the cooling gas therein. The transfer of the residual heat takes place by means of the fall pipe cooler.

To assure residual-heat transfer circulation also in the event of failure of the auxiliary blower, a gas-jet blower is present below the cooler in the fall pipe and is fed from outside the high-temperature reactor. As a result suction is generated in the fall pipe, driving the coolant from the reactor core into the riser pipe and then through the cooler into the fall pipe. The same as the auxiliary blower, the gas-jet blower only serves to initiate the circulation of the residual heat transfer. After the gas-jet blower has performed its task, circulation by natural convection here too shall be set up.

Using such a gas-jet blower allows eliminating the auxiliary blower. As a rule however the auxiliary blower is retained in order to assure residual-heat transfer even for the case of the pressure-relieved reactor, where natural convection alone does not adequately cool the reactor core.

On account of the riser pipe, fall pipe, auxiliary and gas-jet blowers, the above described residual heat draining system is comparatively complex. Moreover the cooler must be so high in the fall pipe and so large that the temperature difference required to maintain the circulation of the residual heat transfer actually shall be attained. Substantial doubt exists about this problem because the cooling gas is heated while flowing down through the reactor core and hence may tend to return into this region.

The object of the invention is to create a residual-heat transfer system for high-temperature reactors assuring reliable heat transfer regardless of the purposes of the cooling gas.

This problem is solved by the invention by providing a bypass duct of which the lower end communicates with the cooling-gas intake and of which the upper end communicates with the cooling-gas outlet, and by a cooler for cooling, at least during the residual-heat transfer operation, a partial flow of cooling gas passing through the bypass duct.

Accordingly the invention provides a bypass duct parallel to the reactor core and passing a partial flow of cooling gas from bottom to top. This partial flow of cooling gas heats up only trivially and further is cooled somewhat in the cooler. In the region of the cooling-gas outlet, this partial flow again combines with the cooling gas coming from the reactor core. On the other hand, the upward flow of the comparatively cold cooling gas in the bypass duct stops and by itself reverses because the cooling gas in the bypass duct is drawn toward the reactor core on account of the natural convection therein. At the same time part of the cooling gas heated in the reactor core in the region of the cooling-gas outlet thereby enters the bypass duct where it is cooled by the cooler, that is, a natural-convection flow is also generated in the bypass duct. The residual-heat transfer circulation through the bypass duct is maintained in problem-free manner thereby because the natural convection generated in the reactor core enhances that generated in the bypass duct, that is, the forces of natural convection in both places are in the direction of the circulation. Accordingly no additional blower with bypass valve and/or a gas-jet blower is required either for the initiation or maintenance of the residual-heat transfer circulation in the manner demanded by the residual-heat transfer systems of nuclear reactors with downward flow through the reactor core. Therefore the residual-heat transfer system of the invention is characterized by high operational reliability and low equipment cost.

The above shall not exclude additional devices such as valves, auxiliary blowers and the like for controlling the partial flow of cooling gas in the bypass duct, should this be called to support the residual-heat transfer in an unpressurized reactor for instance.

It is clear per se furthermore that several such bypass ducts may be provided. Again it shall be within the scope of the invention to mount more than one cooler in the bypass duct. Where only the singular is used in the claims in relation to these means, that shall be merely for semantic simplicity.

Preferably the cooler is mounted in the upper region of the bypass duct, that is as high as possible, because thereby the natural convection in the bypass duct will be enhanced.

The design of the bypass duct and of the cooler with respect to drag and cross-section should be such that an adequately large partial flow of cooling gas passes into the bypass duct when in the residual-heat transfer phase, so that this residual-heat transfer shall be sufficient to prevent more than trivial temperature rises in the reactor core. Preferably the design shall be such that at most 5% of the total mass flow of the cooling gas shall pass through the bypass duct in normal operation of residual-heat transfer, magnitudes of about 1 to 2% already being sufficient. In normal operation, no more than 10%, preferably no more than 5% of the mass flow of the cooling gas shall pass through the bypass duct.

Especially advantageously, a gaseous coolant shall pass through the cooler and said coolant shall be moved also by natural convection. Such coolers are known per se (J. Singh, H. Barnert, H. Hohn, M. Mondry, STEAM GENERATOR CONCEPT OF A SMALL HTR FOR REHEATING AND FOR REMOVAL OF THE RESIDUAL HEAT, Symposium of "Technology of Steam Generators for Gas-cooled Reactors, March 1987). When using such a cooling system, the system of residual-heat transfer is fully passive, that is, its individual components operate in the absence of external power and merely on account of the changed conditions due to shutting down the nuclear reactor.

Care must be taken when matching the bypass duct to the reactor core that the partial gas flow from the bypass duct enters the reactor core uniformly, that is evenly distributed cross-sectionally. Where the reactor core cross-section is circular or the like, several bypass ducts ought to be spread over its periphery. In especially advantageous manner, however, the reactor core shall be annular and comprise a central bypass duct.

BRIEF DESCRIPTION OF DRAWINGS

The drawing elucidates the invention by means of a schematic, illustrative embodiment. Basically the high-temperature reactor 1 comprises a cross-sectionally horizontal annular reactor core 2 surrounding a central column 3. Spherical fuel elements are present in bulk 4 in the reactor core.

The reactor core 2 is enclosed by a lateral reflector 5, a bottom reflector 6 and a ceiling reflector 7. All these reflectors consist of graphite bricks. At its top, the high-temperature reactor 1 is sealed by a ceiling slab 8 and at the bottom by a bottom slab 9.

The reactor core 2 comprises two cooling-gas intakes 10, 11 and two cooling-gas outlets 12, 13. Initially the cooling-gas intakes 10, 11 are horizontal, then they turn upward, passing by means of flow ducts 14, 15, 16, 17 through the bottom reflector 6 into the reactor core 2. The flow ducts 14, 15, 16, 17 are designed in such manner that no fuel elements may drop out of them. The ceiling reflector 7 also comprises flow ducts 18, 19, 20, 21 which are part of the cooling-gas outlets 12, 13. These latter ducts extend horizontally to the outside.

A vertical bypass duct 22 is present in the center column 3. At its upper end this bypass duct communicates with both cooling-gas outlets 12, 13 and at its lower end it is open to the cooling-gas intakes 10, 11. The bypass duct 22 flares at its upper end. A cooler 23 is mounted to the upper end of the bypass duct and communicates on one side with a cooling-medium intake 24 and on the other side with a cooling-medium outlet 25. The cooling medium is a gas, for instance nitrogen or helium. The cooling medium moves by natural convection in a cooling-medium circuit. The other parts of this circuit are not shown in further detail herein. However the design of such a cooling system based on natural convection is known in the state of the art.

The above described high-temperature reactor operates as follows:

In normal operation, the cooling gas driven by a main blower in the direction of the shown white arrows flows through the cooling-gas intakes 14, 15 into the high-temperature reactor 1. On account of matching cross-section and drag in the bypass duct 22, a main mass flow of cooling gas passes by means of the flow ducts 14, 15, 16, 17 into the reactor core 2 and then through the spheres in bulk 4. Depending on the design, the main mass flow of cooling entering at about 400° C. is heated to about 1,000° C. The cooling gas so heated passes through the cooling-gas outlets 12, 13 to the outside and thereupon may be put to use in equipment not shown in further detail for a variety of purposes, for instance for generating steam, for process heat application or for energy generation in a helium gas turbine.

Because of the communication with the cooling-gas intakes 10, 11, an accessory mass flow of cooling gas is tapped and flows—also at a temperature of about 400° C.—into the bypass duct 22 and upward. There it impinges on the cooler 23 where it is slightly cooled. Next this auxiliary mass flow of cooling gas combines again with the main mass flow of cooling gas leaving the reactor core 2 and moves out of the high-temperature reactor 1 through the cooling-gas outlets 12, 13. Both the flow through the reactor core 2 and that through the bypass duct 22 therefore are maintained by the constrained circulation caused by the main blower in the primary circuit of the cooling gas.

If a reactor has been shut down, for instance due to failure of the main blower, this constrained circulation will be interrupted. However the upward flow in the reactor core 2 is maintained because the heating in the spheres in bulk 4 imparts a natural convection from bottom to top to the cooling gas. On the other hand the upward flow of the auxiliary mass flow of cooling gas in the bypass duct 22 stops by itself for lack of constrained forces and heating. Because of the suction caused by the natural convection in the reactor core 2, the flow in the bypass duct 22 perforce is reversed, that is, the comparatively cool auxiliary mass flow of cooling gas in the bypass duct 22 now flows downward as denoted by the black arrows and combines with the main mass flows of cooling gas in the vicinity of the cooling-gas intakes 10, 11 and in this manner enters the reactor core 2. Thereby in turn cooling-gas from the cooling-gas outlets 12, 13 is replenished into the bypass duct 22. The auxiliary mass flow of cooling gas entering at a high temperature of about 1,000° C. is cooled at the cooler 23 whereby a source of natural convection is also formed in the bypass duct 22, though in this case in the downward direction. As shown by the black arrows, a secondary circulation is set up, the arrangement and size of the cooler 23, the cross-sectional shape and the drag of the bypass duct 22 being so matched that for normal residual-heat transfer an auxiliary mass flow of cooling gas shall be generated which is about 1 to 2% of the total auxiliary mass flow of cooling gas. Thereby adequate residual-heat transfer is assured without incurring a substantial temperature rise in the reactor core 2.

Regarding the cooling performance of the cooling system associated with the cooler 23, latter in normal operation shall be subjected to a maximum temperature of 400° C. This temperature is in contrast to the entry temperature of the coolant practically at ambient temperature, and this temperature difference assures the natural convection in the cooling system. In residual-heat transfer operation, the cooler 23 is subjected to the heated auxiliary mass flow of cooling gas at a temperature of about 1,000° C., whereby the coolant shall be commensurately heated in the cooler 23. The resultant temperature difference is substantially higher than for normal operation, and the mass flow rises correspondingly in the coolant circuit. In turn a commensurately enlarged heat transfer follows from the auxiliary mass flow of cooling gas through the cooler 23 into the coolant passing through latter. Accordingly, the cooler 23 is operating especially efficiently in residual-heat transfer in the desired manner.

The residual-heat transfer system of the invention operates entirely passively and is characterized by high operational reliability. It is wholly independent of the design and operation of the subsequent equipment exploiting the heat in the cooling gas. The high-temperature reactor 1 of the invention therefore is applicable also where the primary circuit of the cooling gas contains no steam generator or special cooling systems.

We claim:
1. A high-temperature reactor, comprising:
   a) a reactor core disposed within said reactor;
   b) said reactor having a bottom portion and a top portion;
   c) a bottom cooling-gas intake and a top cooling-gas outlet for passing a cooling gas in a path from said bottom portion to said top portion through said reactor core;
   d) a bypass duct having a lower end communicating with said cooling-gas intake and an upper end communicating with said cooling-gas outlet;
   e) said bypass duct is disposed in parallel to the path of the cooling gas, whereby a partial flow of the coolant gas passes through said bypass duct;
   f) a cooler for cooling the partial flow of the cooling gas passing through said bypass duct in residual heat transfer operation; and
   g) said cooler is disposed in said bypass duct.
2. A high-temperature reactor, comprising:
   a) a reactor core disposed in said reactor;
   b) said reactor having a bottom portion and a top portion;
   c) a bottom-cooling gas intake and a top cooling-gas outlet for passing a cooling gas in a path from said bottom portion to said top portion through said reactor core;
   d) a bypass duct having a lower end communicating with said cooling-gas intake in such a manner that a partial flow of cooling-gas moves upwardly through said bypass duct in normal operation;
   e) said bypass duct having an upper end communicating with said cooling-gas outlet;
   f) a cooler for effecting a downward motion of the partial flow of cooling-gas in said bypass duct during residual-heat transfer; and
   g) said cooler is mounted in said bypass duct.
3. A reactor as in claim 1, wherein:
   a) said bypass duct has an upper region; and
   b) said cooler is mounted in said upper region.
4. A reactor as in claim 2, wherein:
   a) said bypass duct has an upper region; and
   b) said cooler is mounted in said upper region.
5. A reactor as in claim 1, wherein:
   a) said bypass duct has drag and cross-section such that in residual-heat transfer up to 5% of the entire mass flow of the cooling gas during normal operation flows downwardly through said bypass duct.
6. A reactor as in claim 2, wherein:
   a) said bypass duct has drag and cross-section such that in residual-heat transfer up to 5% of the entire mass flow of the cooling gas during normal operation flows downwardly through said bypass duct.
7. A reactor as in claim 1, wherein;
   a) said bypass duct has drag and cross-section such that in normal operation up to 2% of the total mass flow of the cooling-gas moves upwardly through said bypass duct.
8. A reactor as in claim 2, wherein:
   a) said bypass duct has drag and cross-section such that in normal operation up to 10% of the total mass flow of the cooling-gas moves upwardly through said bypass duct.
9. A reactor as in claim 1, wherein:
   a) said cooler is disposed such that the cooling gas passes through said cooler by natural convection.
10. A reactor as in claim 2, wherein:
    a) said cooler is disposed such that the cooling gas passes through said cooler by natural convection.
11. A reactor as in claim 1, wherein:
    a) said reactor core is annular in cross-section; and
    b) said bypass duct is disposed centrally of said annular reactor core.
12. A reactor as in claim 2, wherein:
    a) said reactor core is annular in cross-section; and
    b) said bypass duct is disposed centrally of said annular reactor core.

* * * * *